United States Patent [19]

Bechteler

[11] 4,231,034
[45] Oct. 28, 1980

[54] DISPLAY DEVICE FOR ILLUSTRATING VARIABLE AND FIXED INFORMATION

[75] Inventor: Martin Bechteler, Ortsteil Heimstetten, Fed. Rep. of Germany

[73] Assignee: Siemens Aktiengesellschaft, Berlin & Munich, Fed. Rep. of Germany

[21] Appl. No.: 30,018

[22] Filed: Apr. 16, 1979

[30] Foreign Application Priority Data

May 31, 1978 [DE] Fed. Rep. of Germany ....... 2823845

[51] Int. Cl.² .............................................. G02F 1/13
[52] U.S. Cl. ..................................... 340/765; 40/448; 340/784; 350/341; 350/344; 368/242
[58] Field of Search ................ 340/765; 350/339, 341, 350/344; 40/448; 58/50 R

[56] References Cited

U.S. PATENT DOCUMENTS

| 3,742,600 | 7/1973 | Lowell | 350/344 X |
| 3,824,582 | 7/1974 | Glaser et al. | 58/50 R |
| 3,919,452 | 11/1975 | Ettre et al. | 350/344 X |
| 3,995,941 | 12/1976 | Nagahara et al. | 350/344 X |
| 4,059,956 | 11/1977 | Maeda et al. | 58/50 R |
| 4,116,544 | 9/1978 | Soref | 350/344 X |
| 4,158,485 | 6/1979 | Mueller et al. | 350/344 X |

Primary Examiner—David L. Trafton
Attorney, Agent, or Firm—Hill, Van Santen, Steadman, Chiara & Simpson

[57] ABSTRACT

A device for displaying variable and fixed indicia is provided by liquid crystal cells which give variable as well as fixed information. The variable and fixed information is in the form of alpha and/or numerical characters and/or punctuation characters, such as colons in a digital clock. The fixed characters are formed by members such as spacers which simultaneously space two carrier plates relative to one another as part of a liquid crystal cell. In a preferred embodiment, the display is a so-called twisted nematic display with spacers consisting of a glass solder enriched with a spacer element. The invention may be used in all types of displays having a relatively low tolerance of plate spacing and which contain fixed characters. It is particularly suited for liquid crystal displays in measuring equipment such, for example, as tachometers or watches.

10 Claims, 2 Drawing Figures

DISPLAY DEVICE FOR ILLUSTRATING VARIABLE AND FIXED INFORMATION

BACKGROUND OF THE INVENTION

1. Field of the Invention

This invention relates to display devices and, in particular, to liquid crystal cells which illustrate variable as well as fixed information characters.

2. Description of the Prior Art

There have been many variations described in the past for providing a display of this general type. See, for example, "Electronics" of Aug. 18, 1977, pages 74 and 75, which deals with liquid crystal displays in wrist watches. See also German OS No. 24 35 088.

In addition to continuously changing information, one also wishes to illustrate non-variable symbols in many cases. These fixed characters could be, for example, scale divisions or dimension details in a measuring apparatus or the fixed character could be inserted between the hour numeral and the minute numeral as a read-out aid in watches. In the past, these fixed characters were produced by print or by an engraving in the frontal plate.

BRIEF SUMMARY OF THE INVENTION

It is an object of the present invention to provide the fixed characters in a particular display, namely a display having a relatively narrowly tolerated plate spacing, since they are such that they are readily readable, and also to contribute to the precise reading of the two substrates. Insofar as one dealt with spacing techniques up to now, one always strived for obtaining spacing members which were as invisible as possible. In spite of considerable development endeavors, this aim has not yet been reached, because those very spacing elements, having a properly defined height, nevertheless have an optically interfering effect, for example, glass solder columns with enclosed glass fibers. In contrast thereto, the present invention describes a new path for displays with fixed characters. The spacing members are intentionally designed such that they have an optical contrast against their surroundings. They are carriers of a specific information. The advantages obtained thereby are obvious. The plate spacing becomes simpler, and a specific production step for the fixed symbols is no longer required.

The invention will now be better understood and more precisely explained by description of a preferred embodiment with reference to the enclosed drawings.

DESCRIPTION OF A PREFERRED EMBODIMENT

Figure 1:
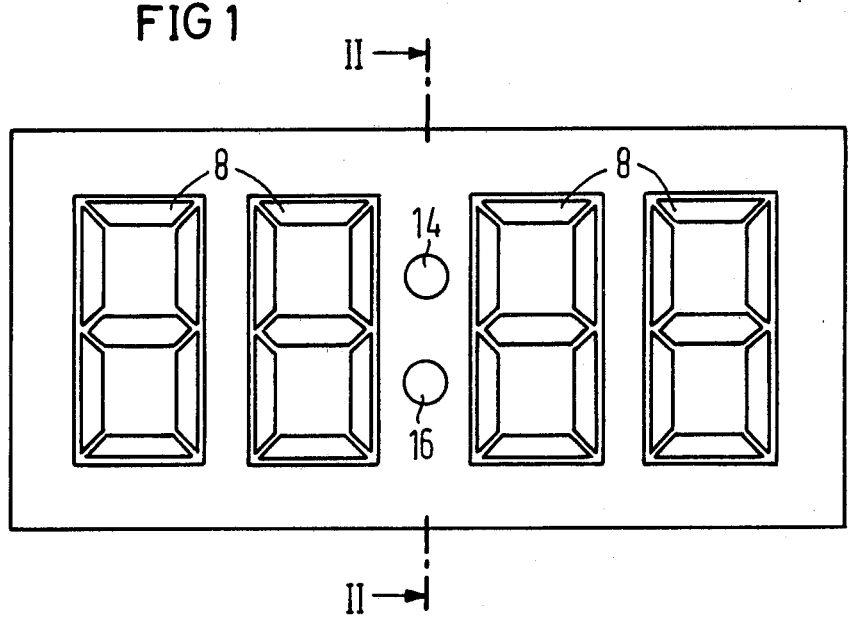
FIG. 1 illustrates in a frontal view a preferred embodiment of the present invention.

In the two figures of the drawing which are drawn schematically, the individual components of a display, which are not particularly required for an understanding of the invention, for example, electric conductors, are omitted for the sake of simplicity.

As shown, a display device is a liquid crystal display provided for a watch which can display the time according to hours and minutes. In the present case, the display operates according to the twisted nematic cell principle and comprises a frontal linear polarizer 1, a frontal carrier plate 2, a rear carrier plate 3, a rear linear polarizer 4 crossed relative to the frontal polarizer, and a reflector 6. The two carrier plates 2 and 3 are tightly connected and supported by a frame 7, and, respectively, bear electrically conductive coatings (frontal electrodes with individual segment electrodes 8, rear electrodes 9). The said coatings and surfaces face one another, and also comprises orientation layers 11 and 12, respectively. The chamber delimited by the frame and the two carrier plates 2 and 3 (namely, substrates 2 and 3) is filled with a liquid crystal layer 13. It will be noted from an inspection of FIG. 1 that the hour display is optically set off by the minute display by means of a colon. This colon is a fixed character in the overall display.

Figure 2:
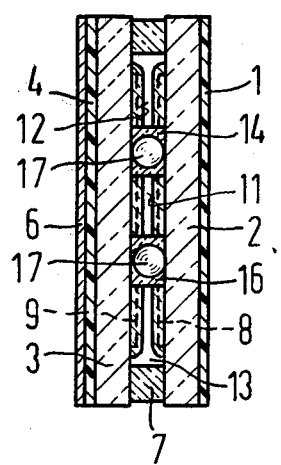
FIG. 2 is a cross-sectional view taken along the line II—II of FIG. 1.

From FIG. 2, it will be understood that the colon is produced by two column-shaped spacers 14 and 16. These columns consist of a glass solder provided with spacing elements 17 and are mounted in a screen print technique. The columns determine the thickness of the liquid crystal layer 13, which, for example, might be 8 $\mu$m. If the frame 7 is formed of the same material as the spacers, the two substrates can particularly economically be fixed relative to one another with the proper spacing provided.

Normally, many different materials can be considered for the spacers. An adhesive could be used in the place of glass solder, and the compound could be enriched, if desired, with glass balls, glass fibers, metal particles or other suitable spacer elements. Additionally, the electrodes of one carrier plate can be simultaneously conveyed over to the level of the electrodes of the other carrier plate with the aid of electrically conductive spacer elements.

The twisted nematic cell described is actuated by a four-step multiplex method, known per se. An image with dark numerals on a light background is formed. The colon is also dark without specific preparation, as the spacers, like the active liquid crystal ranges are optically inactive. If a person wishes to optically emphasize the fixed symbols from the fixed characters, the spacers may be correspondingly colored.

The present invention is not specifically limited to the embodiment illustrated, for the fixed characters suggested can be generally used with every type of display in which a plate spacing with specific spacing elements is desired. This is primarily the case in multiplexible displays and with thin wall and/or large surface cells.

It will be apparent to those skilled in the art that many modifications and variations may be effected without departing from the spirit and scope of the novel concepts of the present invention.

I claim as my invention:

1. A liquid crystal cell display device for illustrating variable and fixed information characters, said cell comprising two carrier plates enclosing a medium therebetween which can be switched between optically different states, said fixed information characters being at least partially provided by spacers located between said two carrier plates and being optically contrasting against their surroundings.

2. A display device according to claim 1, in which said spacers consist of glass solder.

3. A display device according to claim 2, in which said glass solder contains electrically conductive spacer elements.

4. A display device according to claim 2, in which said spacers are electrically insulating spacer elements.

5. A display device according to claim 1, in which said spacers consist of an adhesive provided with electrically conductive spacer elements.

6. A display device according to claim 1, in which said spacers consist of an adhesive provided with electrically insulating spacer elements.

7. A display device according to claim 3, in which said spacer elements are balls generally consisting of glass.

8. A display device according to claim 3, in which said spacer elements are balls generally consisting of metal.

9. A display device according to claim 1, in which said carrier plates are connected to one another by a frame.

10. A display device according to claim 9, in which said spacers consist of the same material as said frame.

* * * * *